United States Patent [19]

Ito et al.

[11] Patent Number: 4,727,531

[45] Date of Patent: Feb. 23, 1988

[54] INFORMATION RECORDING SYSTEM

[75] Inventors: Osamu Ito; Isao Watanabe, both of Hyogo, Japan

[73] Assignee: Mitsubishi Denki Kabushiki Kaisha, Tokyo, Japan

[21] Appl. No.: 722,376

[22] Filed: Apr. 12, 1985

[30] Foreign Application Priority Data

Apr. 13, 1984 [JP] Japan .................. 59-74191

[51] Int. Cl.$^4$ .............................................. G11B 27/36
[52] U.S. Cl. ........................................ 369/58; 369/54
[58] Field of Search .................... 369/54, 58, 46, 110, 369/114, 106

[56] References Cited

U.S. PATENT DOCUMENTS

| | | | |
|---|---|---|---|
| 4,308,612 | 12/1981 | Miyauchi et al. | 369/58 X |
| 4,550,394 | 10/1985 | Maeda et al. | 369/54 X |
| 4,554,652 | 11/1985 | Maeda et al. | 369/54 X |
| 4,570,251 | 2/1986 | Yokota et al. | 369/54 X |
| 4,571,716 | 2/1986 | Szerlip | 369/45 |
| 4,606,016 | 8/1986 | Verboom et al. | 369/54 |

FOREIGN PATENT DOCUMENTS 0019924 12/1980 European Pat. Off. ............ 358/342

OTHER PUBLICATIONS

Optical Digital Data Storage Technologies with Semiconductor Laser Head, Y. Tsunoda et al., Proc. SPIE, vol. 382, pp. 24-31, (1983).
An Optical Digital Memory Using Tellurium Sub-oxide Thin Film-Disc, T. Yoshida et al., Proc. SPIE, vol. 421, pp. 79-84, (1983).

*Primary Examiner*—Aristotelis M. Psitos
*Attorney, Agent, or Firm*—Bernard, Rothwell & Brown

[57] ABSTRACT

An optical data recording system has real time error checking by sensing the level of reflected radiation from the high energy level pulse used to form a spot on a disc, and then comparing the sensed level with a reference signal to thus sense a recording failure or defect in the disc. The sensed signal may be voltage shifted by passing through a coupling capacitance with the output discharged during an initial portion of the recording. Additionally, the reference signal may be derived from the sensed signal by passing through a second capacitive coupling circuit whose output is clamped to zero during a standby mode, the reference output being inverted and reduced by a fixed ratio to provide a proper reference voltage.

2 Claims, 5 Drawing Figures

INFORMATION RECORDING SYSTEM

BACKGROUND OF THE INVENTION

1. Field of the Invention

The present invention relates to an information recording system which records various information on a recording medium and particularly to a circuit for detecting defects on a recording medium during the writing operation.

2. Description of the Prior Art

In information recording system of this type, omission of recorded information is a critical problem. In order to minimize the effect of omission there have been developed various signal formatting techniques for detecting and correcting readout errors. However, the error detection and correction based on the formatting techniques has a limit of ability. An alternative method conceivable is to find (pre-check) unretrievable defects in each sector of the recording medium immediately before it is recorded, so that recording takes place without using the defective portions. This method, however, takes a long pre-checking time comparable with the recording time, and it is unfavorable for a long term mass recording. Furthermore, in some kinds of defect, e.g., a missing deposition layer on the recording medium or a partial change in the recording material, pre-checked defects are not in correspondence to defects estimated on the reproduced waveform of signals, and therefore the reliability is not satisfactory.

Still another method is to detect defects based on the recording information at a low energy level during the recording operation, but this method has a problem of a fluctuating level on the low level side. Therefore, the signal amplitude is so small that it is susceptible to the drift and the like of the circuit, resulting in an inferior detection ability.

SUMMARY OF THE INVENTION

A prime object of the present invention is to provide an improved information recording system which overcomes the foregoing prior art deficiencies.

Another object of the invention is to provide an extremely reliable information recording system capable of detecting defects using a sense level signal derived from recorded information at a high energy level during the recording operation, and yet without increasing the virtual recording time.

Still another object of the invention is to provide an information recording system in which the sense level signal created under the irradiation of high-level energy during the recording operation has a large signal level so that the detection is immune to the drift in the circuit, switching noise and the like.

Other objects and advantages of the present invention will become apparent from the following detailed description of the preferred embodiments taken in conjunction with the accompanying drawings.

DETAILED DESCRIPTION OF THE PREFERRED EMBODIMENT

Figure 1:
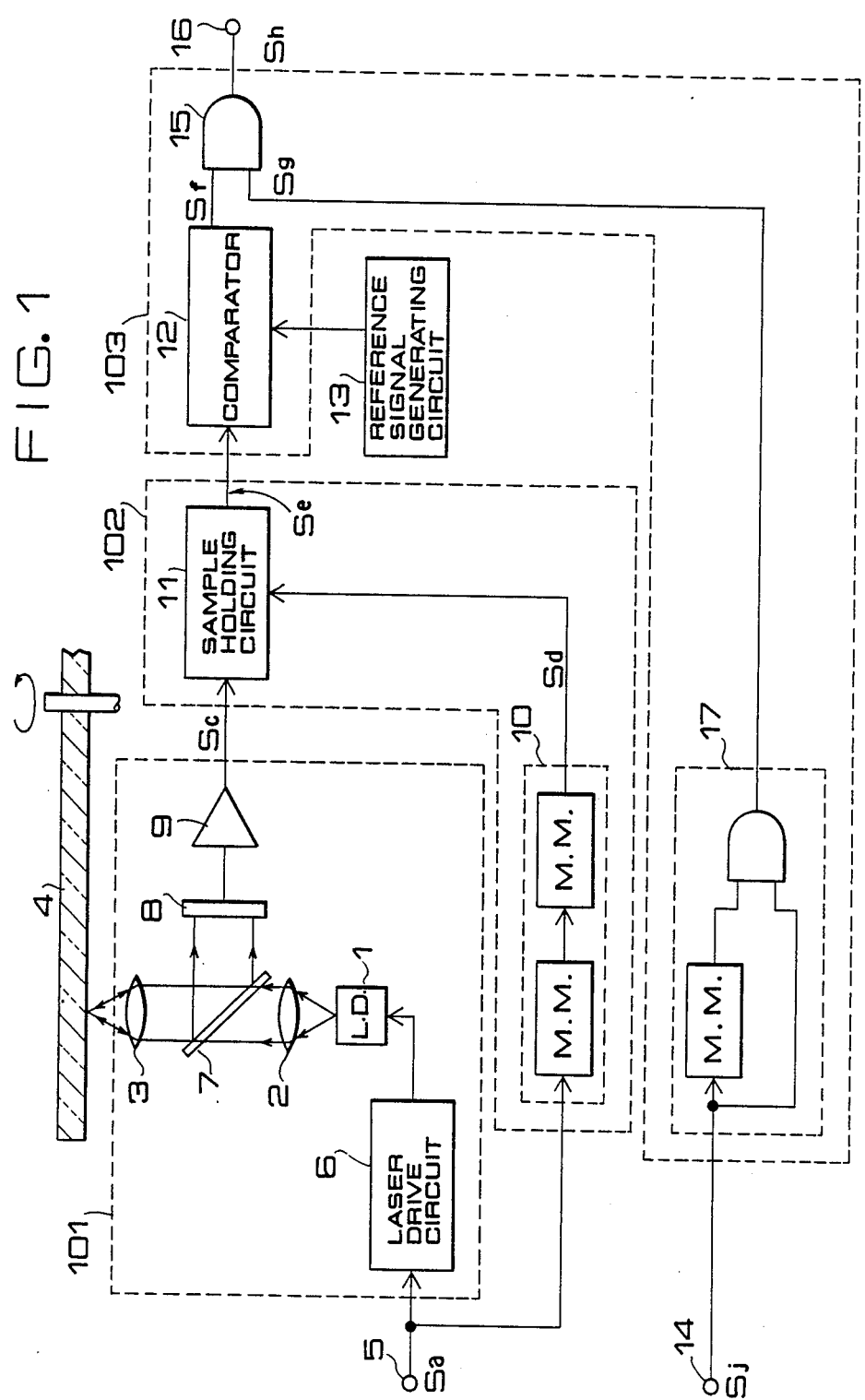
FIG. 1 is a block diagram showing an embodiment of this invention applied to an optical disk information recording medium.

In FIG. 1 showing an embodiment of this invention applied to an optical disk information recording medium, an energy sourcing semiconductor laser (will be termed simply LD hereinafter) 1 radiates a laser light at a high or low energy level (the LD may cease radiating during a period of the low energy level). Then, the laser light is formed into a parallel beam with a collimator lens 2 and conducted through a convergent lens 3, so that it is focused as a fine spot on the recording surface of a rotating disk 4. For recording information, a laser drive circuit 6 renders the LD 1 the intensity modulation with an optimal power depending on the radius of recording track in response to the recording signal entered through an input terminal 5. In this embodiment, a record is made in the form of an increased reflectivity by the irradiation of a laser beam in excess of the threshold level of the recording medium, i.e., a high energy level. It should be noted that this invention can also be applied to the case of a decreased reflectivity by the laser beam. For reproducing information, the recording medium is irradiated by a laser beam at a constant power below the threshold level of the medium, and the variation in the reflectivity is detected from the reflected light. The reflected light carrying information recorded on the disk 4 during the recording operation (including a standby mode) is conducted through the convergent lens 3, reflected by a beam splitter 7, and incident to a photosensor 8 by which the detected light is converted into an electrical signal and it is amplified with a preamplifier 9. In summary, the semiconductor laser (LD) 1, collimator lens 2, laser drive circuit 6, beam splitter 7, photosensor 8, and preamplifier 9 in combination constitute a recorded information sensing means 101.

The arrangement of FIG. 1 further includes a sampling control circuit 10 which consists of two-stage monomultivibrators (MM) and operates to receive the recording signal through the input terminal 5 and produce timed and shaped sampling pulses, and a sample holding circuit 11 which samples and holds the detected signal from the preamplifier 9 in response to the sampling pulse. The sampling control circuit 10 and the sample holding circuit 11 in combination constitute a selection circuit 102 which selectively extracts the sense signal in recorded information at a high energy level from the information sensing means 101.

The extracted signal from the selection circuit 102 is compared by a comparator 12 with the reference signal (a constant voltage) from a reference signal generating circuit 13. The comparator 12 produces a logical high level signal if the extracted signal is less than the reference signal.

The recording gate signal entered through an input terminal 14 operates on a timing circuit 17 to produce a high output only during periods in which defect detection is needed, and through the logical AND process for the output of the timing circuit 17 and the output of the comparator 12 by an AND gate 15, a defect detection signal excluding erroneous outputs in unwanted periods is produced on the output terminal 16. The comparator 12, timing circuit 17 and AND gate 15 in combination constitute a decision circuit 103 which produces a defect detection signal indicating a defect on the information recording medium when the extracted signal from the selection circuit 102 is less than the reference signal provided by the reference signal generating circuit 13.

Figure 2:
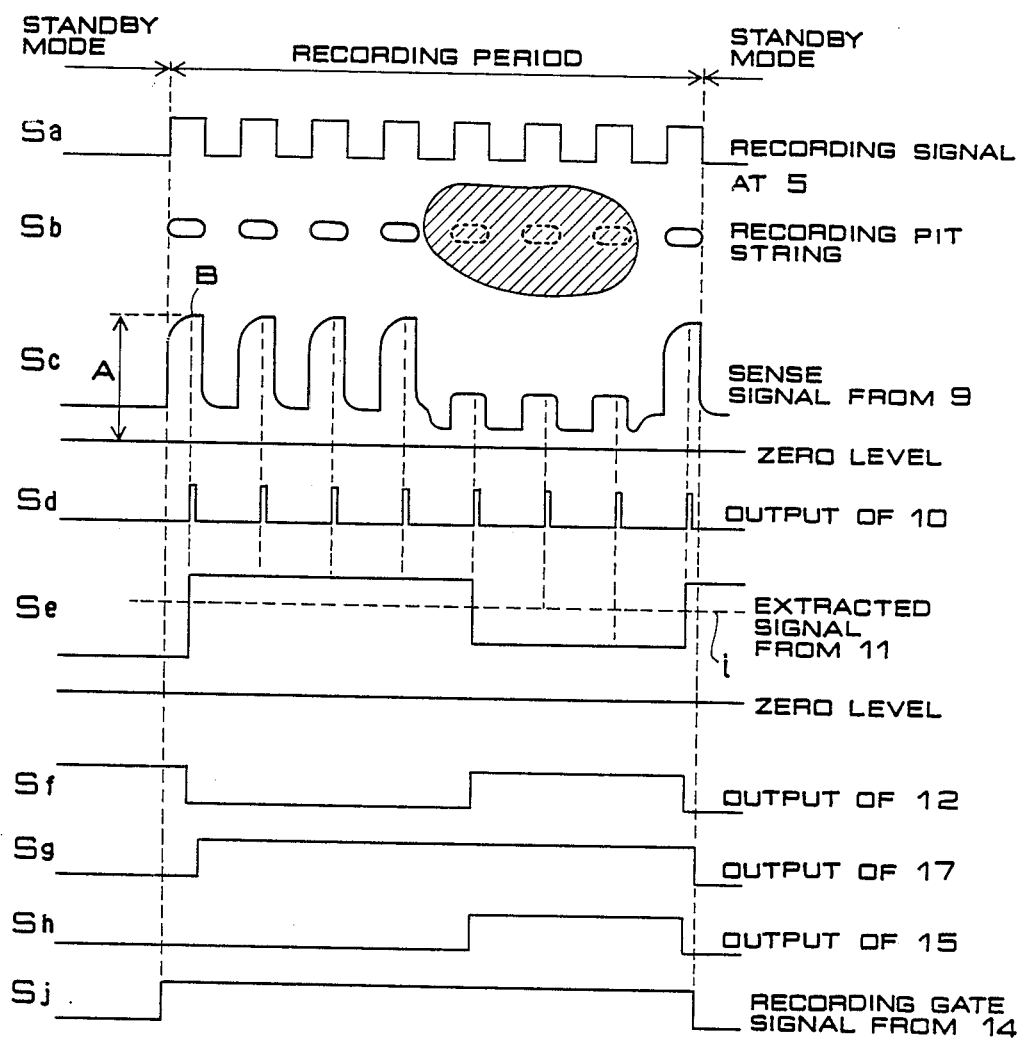
FIG. 2 is a signal waveform diagram used to explain the operation of various portions of the arrangement shown in FIG. 1.

FIG. 2 shows the waveform of signals observed at various portions of the recording system shown in FIG. 1 operating in recording mode and standby mode. Waveform Sa is a recording signal entered through the input terminal 5; Sb represents a pit string formed in the information recording medium in correspondence to the recording signal Sa, with a defective portion of the recording medium indicated by hatching; and waveform Sc is the sense signal provided by the preamplifier 9, indicating a portion of a lower signal level caused by a halved reflectivity in the defective portion. It is assumed here that the preamplifier 9 is of a d.c. signal transmission type and it provides a zero voltage output corresponding to a zero incident light. In the normal recording pit portion, the reflectivity is apt to increase progressively during the irradiation at a high energy level in recording mode, as shown by B, and therefore it is necessary to sample the signal level after the pit formation has reached the thermal equilibrium and the sense signal Sc has entered the saturation region. Through this procedure, defects can be detected using information formed in pits, whereby the accuracy of defect detection is improved. Waveform Sd is the sampling pulse produced by the multivibrator which is timed so that the sampling control circuit 10 provides a high output for sampling the sense signal in a saturation region and provides a low output for holding the sampled signal level. Waveform Se is the output of the sample holding circuit 11 controlled by the sample/hold signal Sd, indicating the reflection intensity based on recorded information at a high energy level during the recording operation, and the signal level falls correspondingly to the defective portion. Horizontal dashed line i on the waveform Se represents the reference level provided by the reference signal generating circuit 13. When the signal Se falls below the reference level, the comparator 12 produces a positive signal shown by waveform Sf. Waveform Sj is the recording gate signal, indicating at a high level the recording period. The signal Sj is fed through the input terminal 14 to the timing circuit 17, in which the monostable multivibrator produces a negative pulse with a certain width in response to the rise of Sj, and these two signals are combined through the AND gate to produce at the output of the timing circuit 17 the defect detection gate signal Sg which has an active period slightly shorter than the recording period at the rising edge. The positive signal Sf and the defect detection gate signal Sg are combined through the AND gate 15 so as to avoid erroneous detection outside the recording period, i.e., standby mode, and also erroneous detection during a period after the beginning of recording until the first pit has been sampled. Waveform Sh represents the defect detection signal produced through the foregoing signal process. As will be appreciated from the above explanation, the system samples the sense signal Sc based on recorded information under a high energy irradiation in recording mode, i.e., at a high energy level, and therefore the system is less susceptible to the sampling noise and drift in the circuit, as opposed to the sampling process based on the record at a low energy level or through the irradiation at an energy level for the reproducing operation.

Although the foregoing description in connection with FIGS. 1 and 2 is based on the assumption that a defect of the information recording medium causes a fall in reflectivity, there are other types of defect due to the partial change of the material causing a rise in reflectivity. On this account, the arrangement may be modified such that the reference signal generating circuit 13 provides two reference signal levels centered by the normal reflection intensity level, thereby producing a defect detection signal Sh in response to extracted signal outside the range defined by the reference levels.

Although in the foregoing embodiment the reference signal generating circuit 13 provides a constant voltage for the entire area of the disk, the reference voltage is preferably made proportional to the high energy level for recording which varies depending on the distance of the track position on the disk from the center when more accurate defect detection is required. For example, arrangement may be made such that the high energy level for recording is determined based on the address information prerecorded on the disk 4 and the voltage of the reference signal is determined using the same information through the D/A conversion.

In order to achieve the defect detection stably against the disparity of reflectivity of the disk 4, the disparity of the transmittance of the optical system and the variation due to aging, the reference signal is made variable depending on the amplitude of the sense signal Sc at recording.

Figure 3:
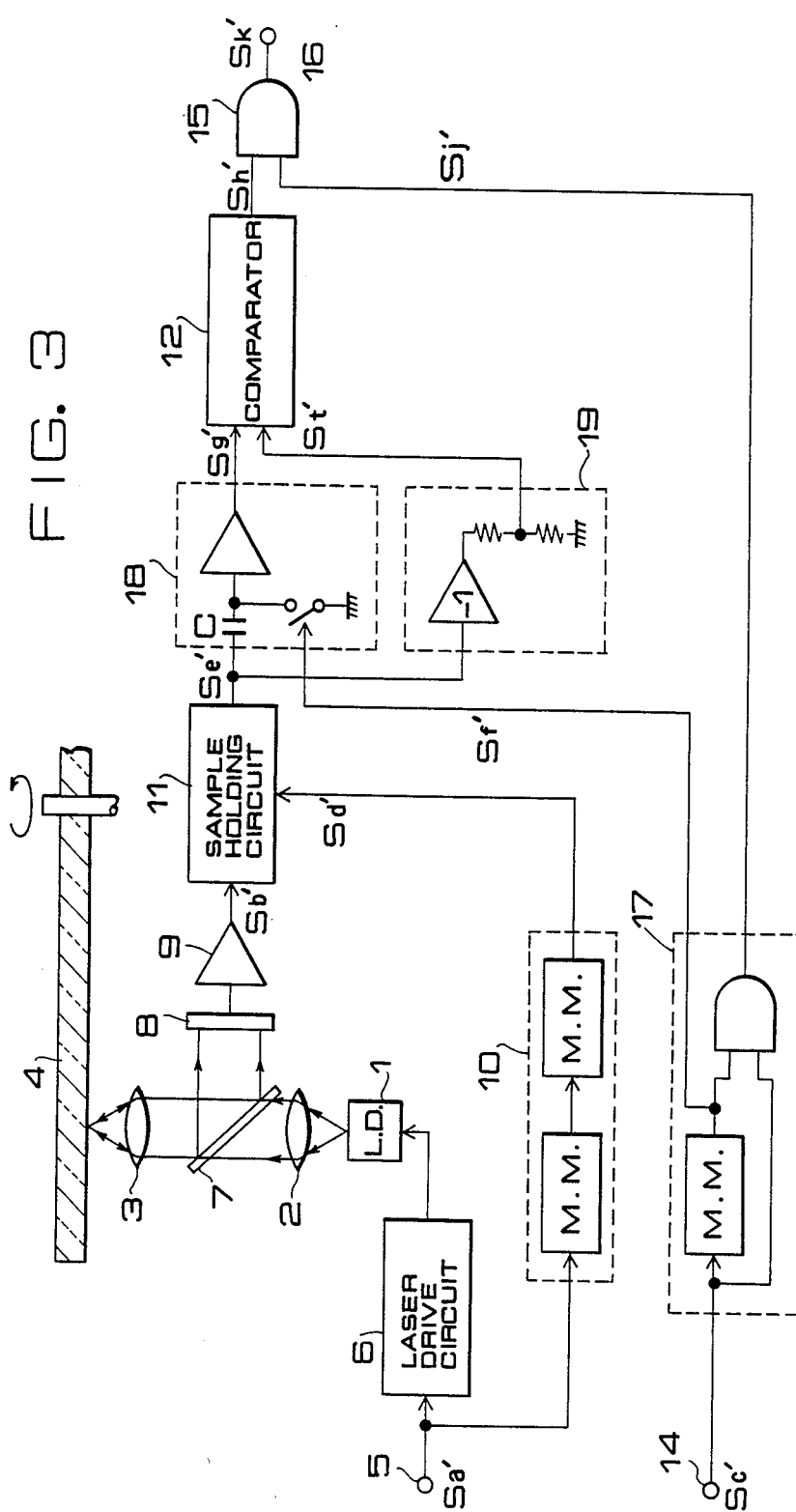
FIG. 3 is a block diagram showing another embodiment of this invention.
Figure 4:
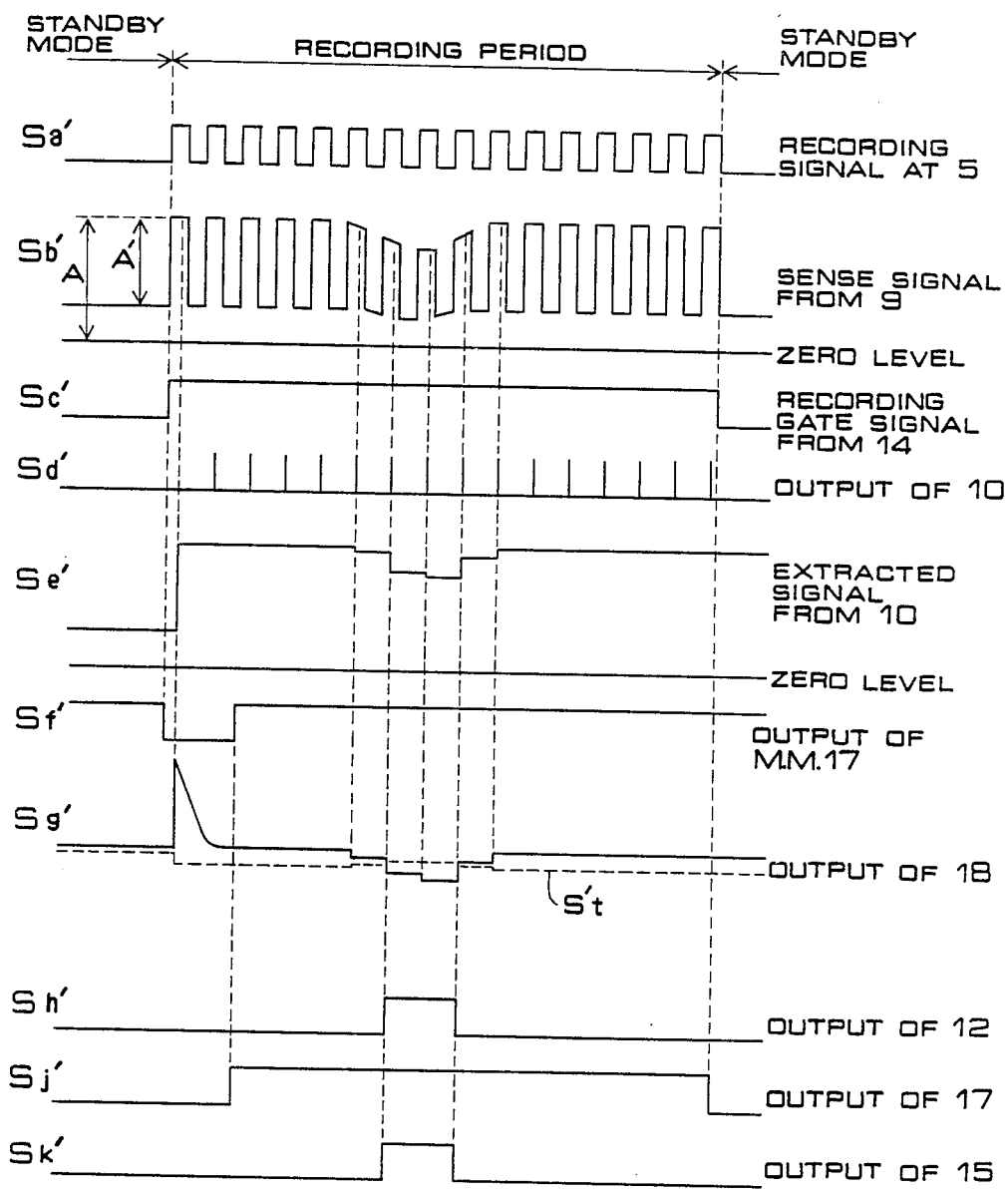
FIG. 4 is a signal waveform diagram used to explain the operation of various portions of the arrangement shown in FIG. 3.

FIG. 3 shows the second embodiment of this invention based on the above-mentioned scheme. The arrangement and its operation will be described referring to the waveform diagram shown in FIG. 4. Waveform Sa' is the recording signal at the input terminal 5; waveform Sb' is the sense signal provided by the preamplifier 9; waveform Sc' is the recording gate signal at the input terminal 14; waveform Sd' is the output of the sampling control circuit 10; and waveform Se' is the extracted signal provided by the sample-holding circuit 11, all of these signals behaving identically to the case of the previous embodiment of FIGS. 1 and 2. The sense signal Sb' from the preamplifier 9 shows a depression of reflectivity due to a defective portion of the recording medium, although it is less in degree than the case shown in FIG. 2. The recording gate signal Sc' is entered through the input terminal 14 to obtain a discharge control signal Sf' having a certain low period after the recording has started at the output of the monomultivibrator in the timing circuit 17. The signal Sf' is fed to a discharge circuit 18, so that the analog switch in the discharge circuit 18 is conducted during a low period to discharge or charge a capacitor C thereby to lower the mean value of the output signal Se' of the sample-holding circuit 11 to a zero level during a "low" period of Sf', while during a "high" period the signal cuts off the analog switch, so that a varying voltage waveform Sg' of the sense signal based on recorded information at a high energy level, with the mean value put to a zero voltage, is obtained.

The reference signal generating circuit 19 is made up of a polarity inverter and a resistor voltage-division circuit designed to have a proper defect detection level in consideration of the pit forming process, and the circuit 19 provides an output waveform St' shown by the dashed line. In general, the peak level variation ΔA of the sense signal at a defect to be detected is sufficiently smaller than the signal amplitude A, and there is no practical problem in using the dashed waveform St' as the reference signal for the comparator 12 with a small detection error of ΔA/A. This reference signal is in direct correspondence to the sense signal Sb' based on recorded information at a high energy level, and therefore the consideration of the variation in transmittance of the optical system and the variation in the disk radius at a high energy level for recording becomes unnecessary. The comparator 12 compares the output Sg' of the discharge circuit 18 with the reference signal St' of the reference signal generating circuit 19 to produce an output Sh'. The defect detection gate signal Sj' produced by the timing circuit 17 is set up in a period so that erroneous detection due to a transient signal in the discharge period and erroneous detection in standby mode are avoided, and a defect detection signal Sk' is obtained at the output of the AND gate 15.

Figure 5:
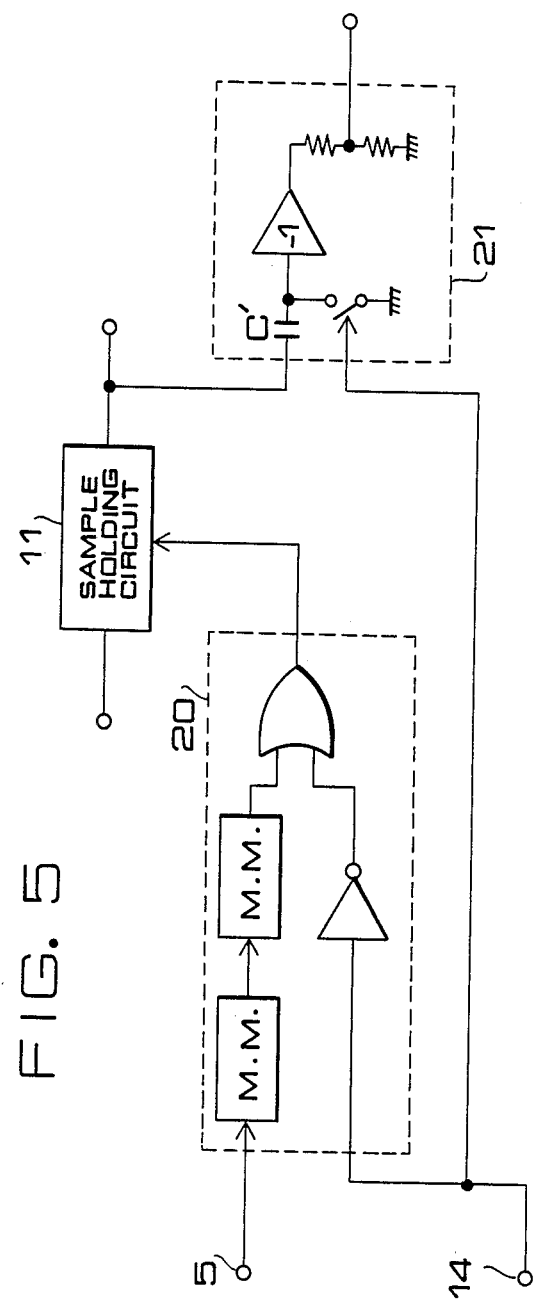
FIG. 5 is a block diagram showing in part still another embodiment of this invention.

In the embodiment of FIG. 3, the preamplifier 9 was assumed to be a d.c. transmission type, and reference level detection cannot be performed normally in the case of a system without d.c. transmission. This can be realized by another embodiment of FIG. 5 showing only portions different from the arrangement of FIG. 3. In the figure, a sampling control circuit 20 receives the recording signal through the input terminal 5 and produces the sampling pulse used in the recording period with its two-stage monomultivibrators (MM). At the same time, it receives the recording gate signal through the input terminal 14, inverts the signal, and then combines it with the sampling pulse through an OR gate, so that sampling takes place also in standby mode. In consequence, the output of the sample-holding circuit 11 includes the signal in standby mode. At the input stage of the reference signal generating circuit 21, a capacitor C' and analog switch operate to clamp the recording gate signal to a low level, i.e., zero level, in standby mode (by the conduction of the analog switch), and then a d.c. level equivalent to the amplitude A' shown by Sb' in FIG. 4 can be reproduced. In general, the reproduced power is sufficiently smaller than the peak recording power, and the amplitude A' is substantially equal to the amplitude A in the case of d.c. transmission. Thereafter, the polarity of the signal is inverted and the amplitude is reduced by a ratio fixed by the resistance voltage divider and the same operation as of FIG. 3 proceeds.

For detecting defects of a type of increasing reflectivity, the reference signal generating circuit 21 may be designed to provide non-inverted and inverted outputs so that the comparator 12 responds to a defect signal out of a range defined by these outputs.

Although the foregoing description is entirely based on the recording medium with its reflectivity increasing through the recording operation, the same effects are achieved also for a recording medium which is recorded, by the formation of pits that results in a lowered reflectivity.

Although in the foregoing embodiments the information recording medium is an optical disk, the present invention can also be applied to magnetic recording as well as opto-magnetic recording. In the magnetic recording system, the detection of signal on the recording medium has a nature of differentiation, and the pickup signal should be rendered a preprocessing of integration. Needless to say, this invention is applicable not only to the disk medium, but to any type of medium including tapes and drums.

As described above, the inventive information recording system operates to detect defects on the recording medium using the sense signal derived from recorded information at a high energy level during a recording operation, whereby the reliability of information recording is enhanced significantly. In addition, the system processes the sense signal with a large signal level created under a high energy level at recording, and advantageously it is less affected by the drift in the circuit, switching noise and the like.

What is claimed is:

1. In combination forming an information recording system wherein a beam of radiant energy is directed to an information recording medium during recording and standby modes and wherein during said recording mode said radiant energy beam is modulated to successive high and lower energy levels for producing a change in reflectivity, that is the ratio of reflected energy level to incident energy level, on the information recording medium at said high energy level, and during said standby mode, which includes durations just before and just after said recording mode duration, the energy level of said radiant energy beam is constantly low, the improvement comprising:

detection means for detecting the signal level of radiation reflected by said information recording medium from the impinging radiant energy beam;

a selection circuit including a sampling control circuit for producing a sampling pulse during said high energy level of said radiant energy beam, and a sample and hold circuit which responds to the sampling pulse for selectively extracting a sense signal during the high energy level while recording;

a reference signal circuit including means for inverting and reducing the output voltage of said sample and hold circuit by a fixed ratio to produce a reference signal defining a range limit;

a capacitive coupling circuit having a discharge circuit for passing the sense signal from the sample and hold circuit and for discharging the output of the coupling circuit for a certain duration after recording has started, so that the d.c. level contained in the sense signal on the output of the coupling circuit is brought to zero; and a decision circuit being connected to the reference signal circuit and the capacitive coupling circuit and being adapted to compare the passed sense signal from the capacitive coupling circuit with the reference signal from said reference signal generating circuit, and producing a defect detection signal indicative of a defect on said recording medium when the sense signal is outside of a range defined by the range limit.

2. In a combination forming an information recording system wherein a beam of radiant energy is directed at an information medium during recording and standby modes and wherein during said recording mode said radiant energy beam is modulated to successive high and low energy levels for producing a change in relfectivity, that is the ratio of reflected energy level to incident energy level, on the information recording medium at said high energy level, and during said standby mode, which includes durations just before and just after said recording mode duration, the energy level of said radiant energy beam is constantly low; the improvement comprising:

detection means for detecting the signal level of radiation reflected by said information recording medium from the impinging radiant energy beam;

a selection circuit including a sampling control circuit for producing a first sampling pulse during said high energy level of said radiant energy beam and for producing a second sampling pulse during the standby mode, and a sample and hold circuit which responds to the first and second sampling pulses for selectively extracting a sense signal during the high energy level while in the recording mode and extracting a second signal while in the standby mode;

a first capacitive coupling circuit having a discharge circuit for passing the sense signal from the sample and hold circuit and for discharging the output of the coupling circuit for a certain duration after recording has started so that the d.c. level contained in the sense signal is brought to a zero potential;

a reference signal generating circuit including a second capacitive coupling circuit connected to the output of the sample and hold circuit, means for clamping the output signal of said second capacitive coupling circuit to a zero potential only during the standby mode, and means for inverting and reducing the output signal of the clamping means at a fixed rate to produce a reference signal defining a range limit during the recording mode; and a decision circuit being connected to the first capacitive coupling circuit and the reference signal generating circuit for comparing the passed sense signal from the first capacitive coupling circuit with the reference signal from said reference signal generating circuit to produce a defect detection signal indicative of a defect on said recording medium when the passed signal is outside of a range defined by the range limit.

* * * * *